United States Patent
McAdams et al.

(10) Patent No.: US 11,484,009 B2
(45) Date of Patent: Nov. 1, 2022

(54) WATER SUPPLY NIPPLE FOR ANIMALS

(71) Applicant: Crystal Spring Colony Farms Ltd., Ste. Agathe (CA)

(72) Inventors: Tom McAdams, Ste. Agathe (CA); Ethan Hofer, Ste. Agathe (CA); Lucien Dnestrianschii, St. Albert (CA)

(*) Notice: Subject to any disclaimer, the term of this patent is extended or adjusted under 35 U.S.C. 154(b) by 43 days.

(21) Appl. No.: 16/906,395

(22) Filed: Jun. 19, 2020

(65) Prior Publication Data
US 2021/0000073 A1    Jan. 7, 2021

Related U.S. Application Data

(60) Provisional application No. 62/869,655, filed on Jul. 2, 2019.

(51) Int. Cl.
*A01K 7/06*    (2006.01)

(52) U.S. Cl.
CPC .................................... *A01K 7/06* (2013.01)

(58) Field of Classification Search
CPC .............................. A01K 39/0213; A01K 7/06
See application file for complete search history.

(56) References Cited

U.S. PATENT DOCUMENTS

| | | | |
|---|---|---|---|
| 3,566,844 A | 3/1971 | Occhiodori |
| 3,581,713 A | 6/1971 | Crooks |
| 3,590,781 A | 7/1971 | Spencer |
| 3,602,197 A | 8/1971 | Fioretto |
| 3,611,999 A | 10/1971 | Hey |
| 3,613,642 A | 10/1971 | Restall |
| 3,646,955 A | 3/1972 | Olde |
| 3,698,685 A | 10/1972 | Lang |
| 3,716,030 A | 2/1973 | Godshalk |
| 3,756,199 A | 9/1973 | Clark, IV |
| 4,006,716 A | 2/1977 | Cross |
| 4,014,365 A | 3/1977 | Peterson |
| 4,258,666 A | 3/1981 | Edstrom |
| 4,329,941 A | 5/1982 | Niki |
| 4,338,884 A | 7/1982 | Atchley |
| 4,356,998 A | 11/1982 | Bach |
| 4,391,225 A | 7/1983 | Sparks |

(Continued)

FOREIGN PATENT DOCUMENTS

| | | |
|---|---|---|
| CN | 104430041 | 3/2015 |
| WO | WO-9605725 | 2/1996 |

*Primary Examiner* — Joshua J Michener
*Assistant Examiner* — Henry Hooper Mudd
(74) *Attorney, Agent, or Firm* — Adrian D. Battison; Ade & Company Inc.; Ryan W. Dupuis

(57) ABSTRACT

A water nipple controlled by the animal has a valve seat inside a housing. The valve member has an elongate valve shaft providing a forward end at the circular discharge mouth for operation by the animal. A resilient body on the valve member defines a convoluted or serpentine water flow path for flow of water along the flow path through the housing with the flow path defining a rate of flow of the water. A resilient ring is mounted on the valve shaft spaced the valve seat and the forward end with an outside edge of the resilient ring adjacent to and spaced from the inside surface of the housing so as to define an annular channel therebetween through which the water passes so that the resilient ring restricts direct flow of water from the valve seat to the discharge mouth to prevent excess squirting of the water.

10 Claims, 5 Drawing Sheets

(56) References Cited

U.S. PATENT DOCUMENTS

| | | | |
|---|---|---|---|
| 4,402,343 | A | 9/1983 | Thompson |
| 4,403,570 | A | 9/1983 | Freehafer |
| 4,406,253 | A | 9/1983 | Atchley |
| 4,416,221 | A | 11/1983 | Novey |
| 4,561,633 | A | 12/1985 | Haiges |
| 4,586,464 | A | 5/1986 | Agerley |
| 4,637,345 | A | 1/1987 | Hostetler |
| 4,660,508 | A | 4/1987 | Kleinsasser |
| 4,819,585 | A | 4/1989 | Dolan |
| 5,065,700 | A | 11/1991 | Cross |
| 5,255,632 | A | 10/1993 | Thomas |
| 5,373,811 | A | 12/1994 | Wastell |
| 5,427,058 | A | 6/1995 | Chung |
| 5,494,000 | A * | 2/1996 | Tanabe ............... A01K 7/06 119/72.5 |
| 5,640,926 | A | 6/1997 | Kleinsasser |
| 5,968,083 | A | 10/1999 | Ciciarelli et al. |
| 6,058,881 | A * | 5/2000 | Thompson ............ A01K 39/02 119/72.5 |
| 6,748,899 | B1 | 6/2004 | Momont |
| 6,981,469 | B1 | 1/2006 | Welbourne |
| 7,051,676 | B1 | 5/2006 | Deshaies |
| 7,677,531 | B1 | 3/2010 | Hollars |
| 7,810,787 | B2 | 10/2010 | Johnson |
| 7,832,356 | B2 | 11/2010 | Kleinsasser |
| 8,136,482 | B2 | 3/2012 | Tobita |
| 8,166,917 | B2 | 5/2012 | Welbourne |
| 8,844,467 | B1 | 9/2014 | Folkerts, Jr. et al. |
| 9,226,482 | B2 | 1/2016 | Cardaropoli |
| 9,392,773 | B2 | 7/2016 | Willis |
| 9,433,190 | B2 | 9/2016 | Johnson |
| 9,615,541 | B2 | 4/2017 | Herring, II et al. |
| 9,814,213 | B1 | 11/2017 | Lane |
| 10,178,853 | B2 | 1/2019 | McAdams et al. |
| 2010/0043716 | A1 | 2/2010 | Klanke |
| 2017/0215376 | A1 | 8/2017 | Herring, II et al. |

\* cited by examiner

WATER SUPPLY NIPPLE FOR ANIMALS

This application claims the benefit under 35 U.S.C. 119(e) of U.S. Provisional Application Ser. No. 62/869,655 filed Jul. 2, 2019.

This invention relates to a water supply nipple for animals.

BACKGROUND OF THE INVENTION

In U.S. Pat. No. 10,178,853 (McAdams) issued Jan. 15, 2019 assigned to the present applicants is disclosed a water supply nipple comprising a housing through which the water passes. A valve component mounted in the housing is operable by the animal between a closed position and an open position relative to a valve seat in which water is discharged through an outlet opening at the front end of the housing for dispensing to the animal. The housing has an interior surface and a resilient body mounted in the housing with an exterior surface of the resilient body in contact with the interior surface of the housing forming a convoluted channel through which the water passes from the supply to the outlet opening wherein the resilient body applies a spring force to the component to move the component to the closed position so that operation of the component by the animal to the open position acts to compress the resilient body.

SUMMARY OF THE INVENTION

The present invention provides an improvement over the above device which reduces a tendency for water to squirt where there is provided a water supply nipple for supplying water to an animal comprising a generally tubular housing having a tubular inside surface surrounding a longitudinal axis of the housing through which the water passes from a supply at a rear end of the housing to a discharge mouth at a forward end of the housing;

a valve in the housing having an annular valve seat mounted in the housing and a movable valve member operable by the animal movable between a closed position and an open position in which water is discharged through the discharge mouth for dispensing to the animal;

a spring member biasing the valve member onto the valve seat to the closed position;

the valve member having elongate valve shaft extending longitudinally of the axis providing a forward end presented at the discharge mouth so that a mouth of the animal can engage the valve shaft to tilt the valve member in the housing to move the valve member to the open position;

and a resilient ring mounted on the valve shaft surrounding the valve shaft located between the valve seat and the forward end with an outside edge of the resilient ring adjacent to and spaced from the inside surface of the housing so as to define an annular channel therebetween through which the water passes so that the resilient ring restricts direct flow of water from the valve seat to the discharge mouth to prevent excess squirting of the water.

Preferably the shaft has an annular recess thereon locating an inner edge of the resilient ring to hold the ring at a required position on the shaft.

Preferably the resilient ring is axially spaced from the valve seat so as to define an annular chamber around the shaft behind the resilient ring.

Preferably the outside edge the resilient ring is spaced inwardly of the inside surface of the housing to a distance such that the outside edge still intersects a straight line between the valve seat and the discharge mouth to impinge on water escaping through the valve seat.

Preferably the water escaping from the valve seat squirts into the housing and is restrained in its flow by the gap between the resilient ring and the inside surface to slow the flow and reduce the tendency to squirt.

Preferably the resilient ring is annular and has circular outer edge spaced from the circular inside face of the housing so that the valve shaft can be deflected in any direction radial of the axis till the outer edge engages the inside surface, with the resilience of the ring allowing some deformation to allow further movement of the shaft toward the mouth. The shaft projects forward of the mouth so as to be accessible to the animal grasping the nipple in its mouth.

Preferably the discharge mouth is circular and lies in a radial plane of the axis. In this way the valve is symmetrical and can be mounted in any orientation without any preferred direction of movement of the shaft.

Preferably the spring member comprises a resilient body mounted in the housing with an exterior surface of the resilient body in contact with the inside surface of the housing and there is provided a recess located on the outer surface of the resilient body which is in contact with the inside surface of the housing so that the recess and the inside surface form a convoluted, preferably helical, channel through which the water passes from the supply to the discharge opening, wherein the resilient body applies a spring force to the valve component to move the component to the closed position so that operation of the component by the animal to the open position acts to compress the resilient body.

Extended analysis and trial of arrangements with valve designs of this general type have shown that one of the challenges is the formation of a small pressurized reservoir of water between the calibrating orifice plate and the biasing actuator flange. This can cause a small burst of water every time the actuator is triggered and the pressurized water is released. This burst of water can cause an overflow of water if frequent on-off periods are caused by the animals.

The present invention has identified the elements of the water nipple design that cause this initial water burst and provides a new valve design that eliminates the inconsistency of dispensing.

In operation, the actuator displacement opens the valve and water starts to flow. Due to the longer and restricted serpentine passages, this is not an instant reaction. The restricted serpentine insert will cause a small delay in the full water flow. When the actuator is released, the valve is switched off and the process is reversed. The passage acts as a shock absorber to dissipate the energy in the oscillations and reduce the amplitude of the oscillations to allow for a more constant water flow. A longer travel of the water will also create a drop in pressure due to turbulence and friction. This will allow using a higher pressure in the water circuit feeding all the valves in a barn circuit. The introduction of the new helical body also acts to reduce the formation of the mini water reservoir inside the valve. This will eliminate the initial burst of water when the activator is displaced. The true calibration of the valve will depend on the cross-sectional area of the helical channel, so that the conventional orifice plate has only the role of pre-adjusting the water flow. The required pressure at the nipple inlet can be calculated using Bernoulli Equation. The water nipple dispensing orifice is 0.078"DIA (2 mm), for dispensing 4 cups of water/min (0.25 gpm) and the pressure required is 3.61 psi.

The water nipple described herein can be used as a separate-alone water supply or as part of a method of feeding animals where the method comprises:

providing for the animals access to a feeder;

providing in the feeder an elongate trough having a base and a sidewall for receiving and containing feed and water and arranged such that the head of the animal can reach over an upper front edge of the sidewall to the base for eating the feed and water;

providing in the feeder an elongate shelf providing a substantially horizontal surface for receiving feed;

the horizontal surface of said shelf being arranged at a height above and rearwardly of said front edge so as to allow access by the head of the animal to said shelf for direct feeding therefrom, and between said shelf and said front edge to the base;

providing in the feeder a hopper for continually depositing feed onto said shelf arranged such that deposited feed on the shelf remains on said shelf but can be removed to the trough by the animal;

providing the water supply for the feeder for dispensing water into the trough including a pipe supplying water to the feeder.

BRIEF DESCRIPTION OF THE DRAWINGS

Embodiments of the invention will now be described in conjunction with the accompanying drawings in which.

DETAILED DESCRIPTION

Figure 1:
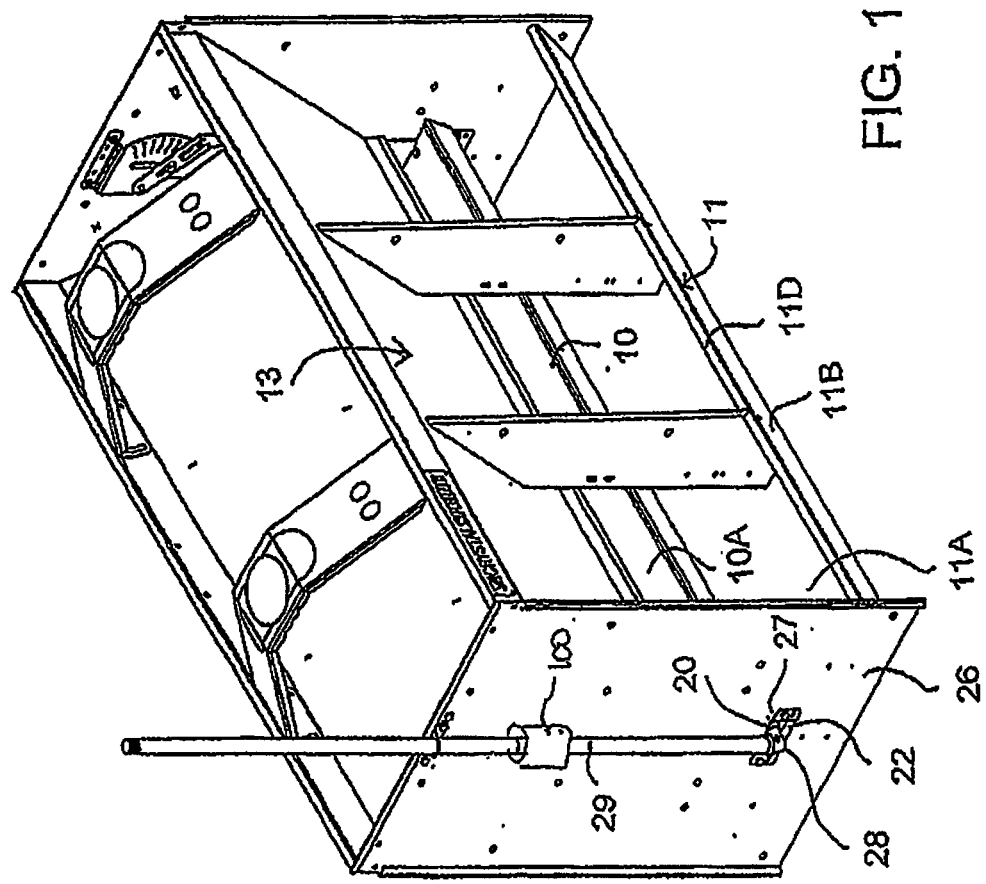
FIG. 1 is an isometric view of an embodiment of a feeder according to the present invention.
Figure 2:
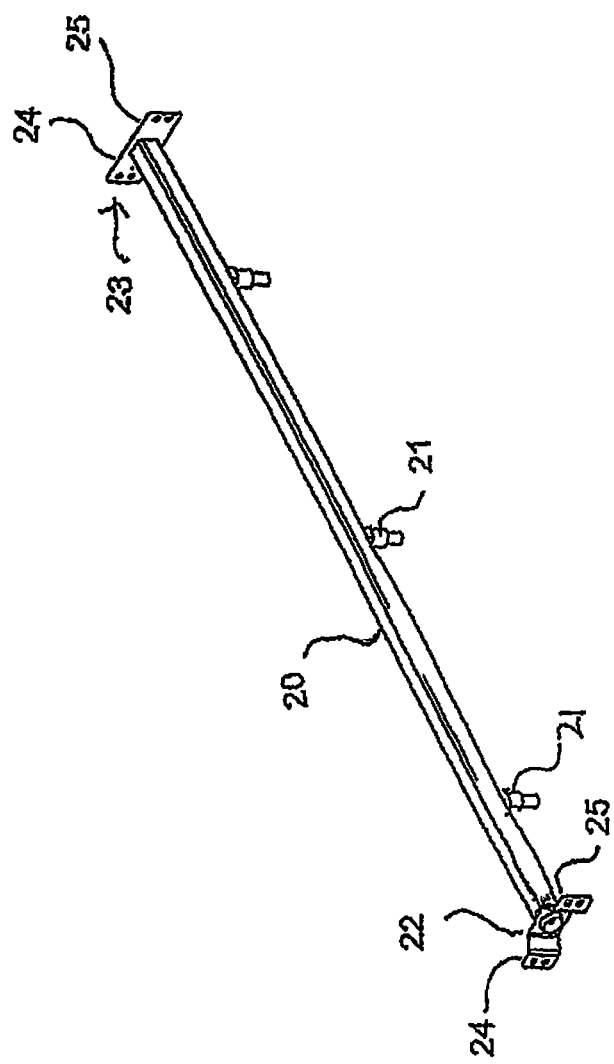
FIG. 2 is an isometric view of the water line of the feeder of FIG. 1.

The embodiment shown in FIG. 1 is of the type shown a wet and dry feeder or shelf-type feeder in which the feed is deposited onto a shelf 10 positioned above a trough 11 so that the feed is available in dry condition on the shelf 10 accessible by the animal and can be moved by the animal to the trough for mixing with water for taking in wet condition. A hopper 13 is located above the shelf for depositing the feed on the shelf. This type of feeder is well known and further details are shown in many patents of the present applicants.

The feeder can be double sided or single sided as is well known. The feeder can be adjustable as described in the second and third above patents or may be a fixed size feeder as disclosed in the first above patent.

Beneath the shelf is a first water line 20 with a series of animal-controlled nipples 21 at spaced positions along the length of the water line which can be actuated by the animal to discharge water into the trough from the first water line. The nipples can be bite nipples which are not intended to drink from but discharge into the trough or they may be drinking nipples. When actuated water runs freely from the supply line 20 into the trough 11.

The water supply line 20 comprises an elongate tubular duct of square cross-section with the nipples attached onto a bottom face of the square tube. At each end of the tube is provided a respective bracket 22, 23 in the form of a plate with two side wings 24, 25 which bolt to a respective end wall 26 of the feeder.

As shown in previous examples of the feeder of the present Applicants, the end walls 26 are parallel and stand vertically so as to form ends of the hopper 13 and the trough 11. Each end wall has a hole 27 through which the end of the water line projects to allow the attachment of the bracket to the exterior of the end wall.

Water is supplied to the water line by a pipe 29 connected at the bracket 22 to the line 20 by an elbow 28 connected by a thread 28A. The pipe 29 extends vertically to an overhead connector of a water supply (not shown). The pipe is held vertical by a bracket 30 at the top of the wall 26 and by the bracket 22.

The arrangement herein therefore provides an apparatus and method of feeding animals where the feeder includes the elongate trough 11 having a base 11A and a sidewall 11B for receiving and containing feed and water and arranged such that the head of the animal can reach over an upper front edge 11D of the sidewall 11B to the base 11A for eating the feed and water.

The horizontal surface 10A of said shelf being arranged at a height above and rearwardly of the front edge so as to allow access by the head of the animal to the shelf for direct feeding therefrom, and between the shelf and the front edge to the base.

The hopper is arranged for continually depositing feed onto the shelf arranged such that deposited feed on the shelf remains on said shelf but can be removed to the trough by the animal.

The arrangement herein provides firstly a water flow regulator 100 and a modified water supply nipple 21 both of which use a novel flexible insert with an extended flow path as described above.

Figure 3:
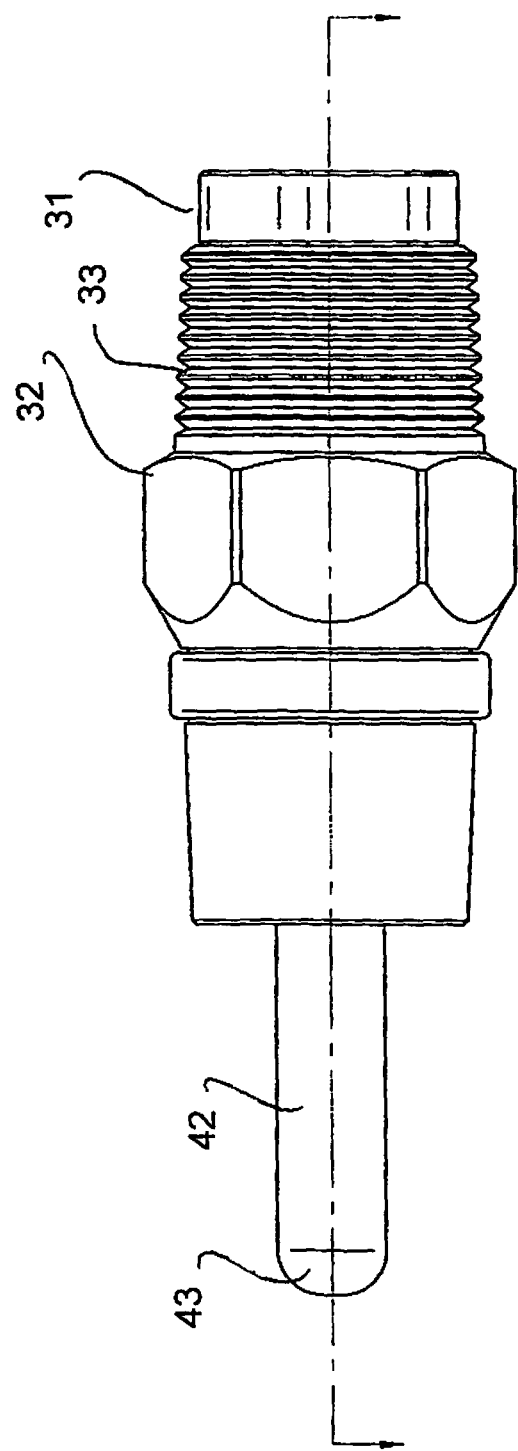
FIG. 3 is a side elevational view of one nipple of the set of nipples of FIG. 2 showing the construction of the water nipple according to the present invention.
Figure 4:
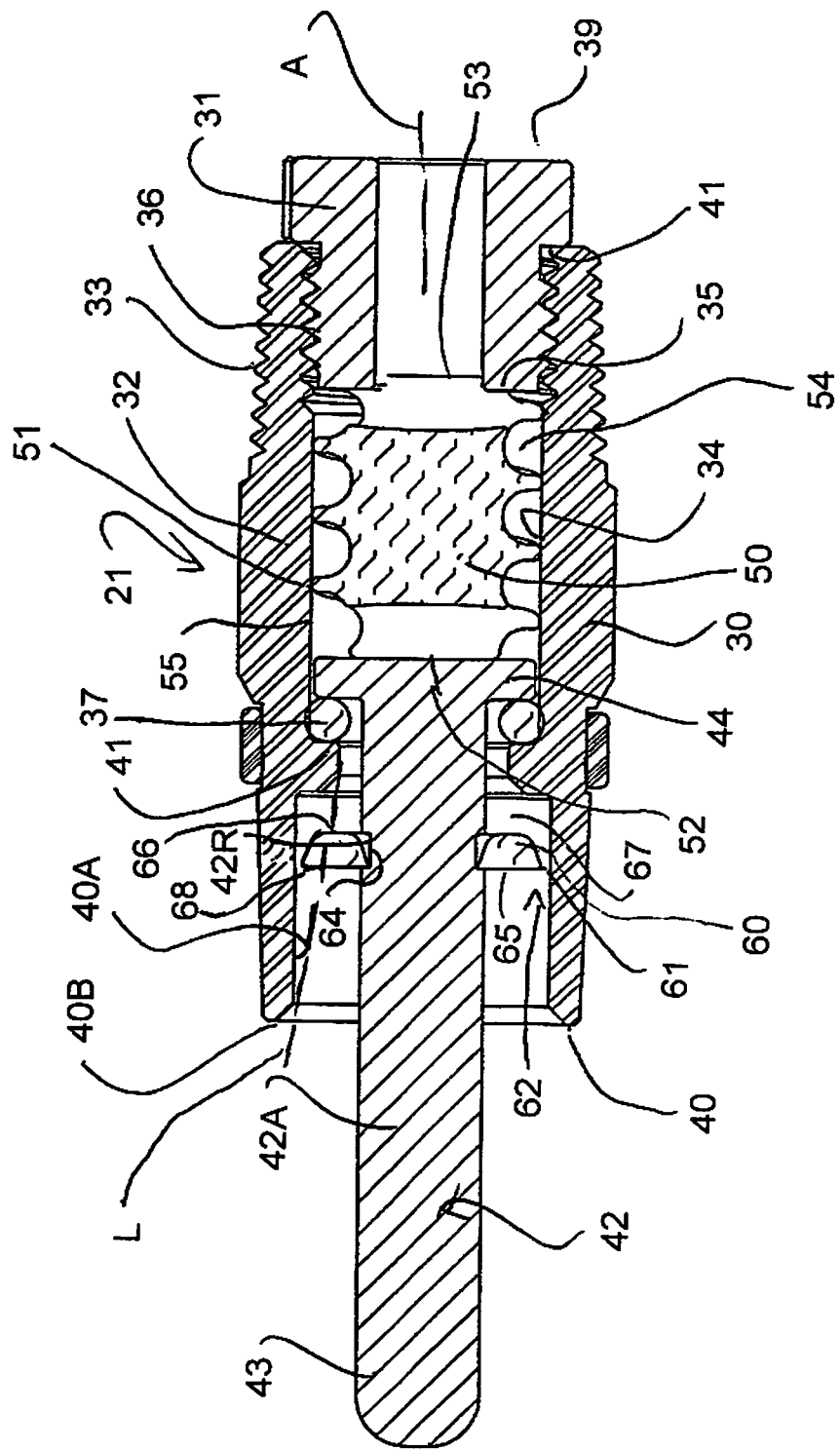
FIG. 4 is a cross-sectional view of the nipple of FIG. 3 showing the nipple in the closed position.
Figure 5:
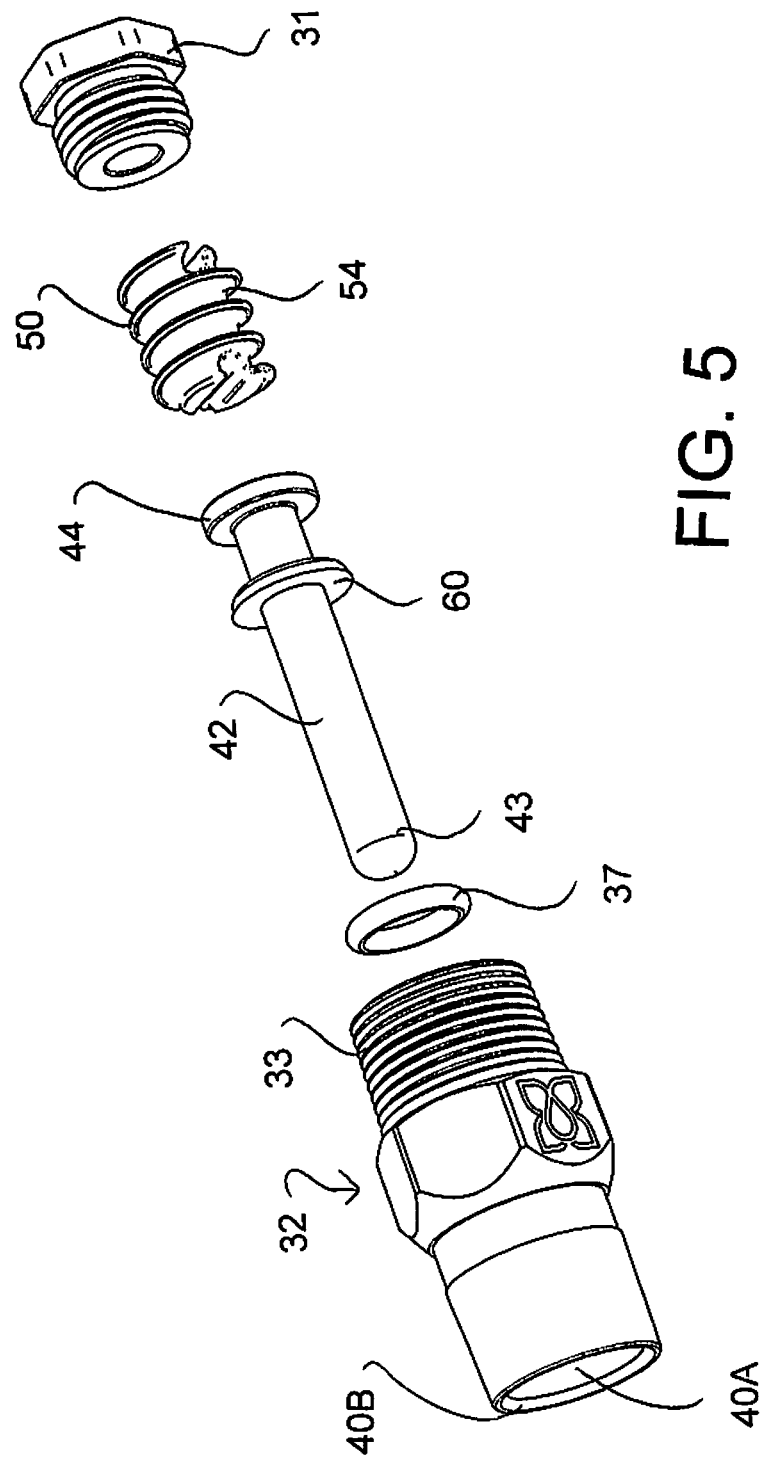
FIG. 5 is an exploded view of the nipple of FIG. 3.

As shown in FIGS. 3 to 5, the water nipple 21 on the water supply for controlling dispensing of the water includes a housing 30 through which the water passes. The housing is formed in two parts 31 and 32 connected together at a threaded section 36 where the portion 31 carries a male threaded portion and the part 32 carries a female threaded portion for interconnection.

The housing provides a through bore 34 from an inlet end 39 to a discharge end 40. A center portion 55 of the bore is widened at a shoulder 35 at an end of the portion 31 to form a cylindrical chamber within the housing at the part 32. At the opposite end of the center portion is a shoulder 41 at the inner end of the second part 32. Beyond the shoulder 41 the housing opens wider to form a cylindrical channel 40A defining a circular mouth 40B at the end 40. The housing defines a longitudinal central axis A with the channel 40A and the mouth surrounding the axis and the mouth lying in a radial plane of the axis. The inner end 39 carries a male threaded position 33 for threaded connection to a connector on the pipe 20.

An actuator component 42 comprises a shaft 42A mounted in the housing 30 and has an end portion 43 projecting beyond the mouth 40B so as to be accessible to be operable by the animal so that the actuator is movable between an closed position shown in FIG. 4 and an open position for control by the animal of the dispensing of the water.

The actuator 42 includes a flange 44 inside the shoulder 41 so that the flange 44 and shoulder 41 contain an O-ring seal 37 which is squeezed between the flange 44 and the shoulder 41. Movement of the portion 43 within the mouth 40B in any direction relative to the axis A lifts the flange 44 off the O-ring 37 and allows water to pass from the center portion of the bore 55 into the channel 40A and from the discharge mouth 40B of the housing.

The position of the shoulder 35 sets a height from the shoulder 35 to the rear face of the flange 44 in which is provided a resilient spring body 50 which is cylindrical with a peripheral surface 51 and end surfaces 52 and 53. The spring body provides a spring force between the shoulder 35 and the end face of the flange 44 so as to bias the flange 44 into engagement with the O-ring 37 to tend to hold the actuator in the closed position.

The body 50 in the housing defines a convoluted water flow path in the form of a helical channel 54 on the peripheral surface 51 extending from the inlet end 53 at the orifice disk 46 to the end face of the flange 43. The channel 54 cooperates with the inside surface of the center portion 55 to form a helical path 57 through the housing from the orifice disk to the O-ring 37.

The helical path 57 is longer than a straight path through the body for flow of water along the flow path 57 through the housing with the flow path defining a rate of flow of the water.

The adjustment of the application of pressure to the resilient body acts to change an amount of compression of the resilient body so as to distort the water flow path 54 and change the rate of flow. This squeezes the channel, so that the channel is reduced in depth to change the cross-section of the path.

The peripheral surface of the body is an exterior cylindrical surface shaped to match the interior surface of the housing so that the body is resilient and is shaped as a loose fit within the housing. The compression provided by connection of the two portions of the housing thus acts to force the peripheral surface into contact with the surface of the housing when compressed to hold the body in place and to seal the surfaces between the channels to cause the water to flow only through the helical channel defining the path.

The present invention therefore provides a water supply nipple for supplying water to an animal which reduces a tendency for water to squirt.

The generally tubular housing 30 has a tubular inside surface 55, 40A surrounding the longitudinal axis A of the housing through which the water passes from the supply at a rear end 39 of the housing to the discharge mouth 40B at the forward end of the housing.

The valve in the housing has an annular valve seat 41 mounted in the housing and a movable valve member 42 operable by the animal movable between the closed position and the open position in which water is discharged through the discharge mouth for dispensing to the animal. This movement is obtained by moving the flange 44 away from the seat 41 to allow water to pass the O-ring 37 at the side that is opened by tilting of the valve member 42.

The spring member 50 acts to bias the flange 44 onto the valve seat 41 to the closed position.

The valve member 42 has an elongate valve shaft 42A extending longitudinally of the axis A providing a forward end 43 presented at the discharge mouth 40B so that a mouth of the animal can engage the valve shaft 42A to tilt the valve member 42 in the housing 30 to move the flange 44 to the open position.

In accordance with the invention there is provided a resilient ring 60 mounted on the valve shaft 42A of the valve member 42 with the ring 60 surrounding the valve shaft 42A and located between the valve seat 41 and the forward end 40B of the bore 30. The ring 60 has a front face 65, a rear face 66, an outside face 61 and an inner edge 64. The outside edge 61 of the resilient ring 60 is located adjacent to and spaced from the inside surface 40A of the bore 40 of the housing so as to define an annular channel 62 therebetween. The outside edge is so that the resilient ring 60 restricts direct flow of water from the valve seat 41 to the discharge mouth 40B to prevent excess squirting of the water.

The shaft 42 has an annular recess 42R thereon locating the inner edge 64 of the resilient ring 60 to hold the ring 60 at a required position along the length of the shaft 42. This position is spaced from the outer surface of the seat 41 so that the rear surface 66 of the ring 60 is axially spaced from the front surface of the valve seat 41 so as to define an annular chamber 67 around the shaft 42 behind the resilient ring 60.

The outside surface 61 of the resilient ring 60 is chamfered from the front surface 65 to the rear surface 66 so that the outer face 61 of the ring is inclined outwardly from the rear face 66 to an outermost edge 67 at the front face 65. The outermost edge 68 is spaced inwardly of the inside surface of the housing to a distance such that the outside edge 68 still intersects a straight line L between the inner edge of the valve seat where the water emerges and the edge of the discharge mouth 40B so that a part of the disk shaped ring 60 acts to impinge on water escaping through the valve seat 41.

That is the water, escaping from the valve seat at whatever location around the shaft 42 the water escapes, which depends on which direction the shaft 42 is depressed, squirts into the housing within the chamber 67 and is restrained in its flow by the gap 62 between the resilient ring 60 and the inside surface 40A to slow the flow and reduce the tendency to squirt. The water thus cannot escape from the chamber 67 without impinging on the ring 60 so that its flow rate is disturbed and reduced by the presence of the ring 60.

The resilient ring 60 is annular and has the circular outer face 61 spaced from the circular inside face 40A of the housing so that the valve shaft 42 can be deflected in any direction radial of the axis till the outer edge 68 engages the inside surface 40A. The resilience of the ring 60 allows some deformation to allow further movement of the shaft 42 toward the mouth 40B. The shaft 42 projects forward of the mouth 40B so as to be accessible to the animal grasping the nipple in its mouth.

The discharge mouth is also circular and lies in a radial plane of the axis A. In this way the valve is symmetrical and can be mounted in any orientation without any preferred direction of movement of the shaft 42.

The invention claimed is:

1. A water supply nipple for supplying water to an animal comprising:
    a generally tubular housing having a tubular inside surface surrounding a longitudinal axis of the housing through which the water passes from a supply of the water under pressure at a rear end of the housing to a discharge mouth at a forward end of the housing;
    a valve in the housing having an annular valve seat mounted in the housing and a movable valve member operable by the animal movable between a closed position and an open position in which water is discharged through the discharge mouth for dispensing to the animal;
    a spring member biasing the valve member onto the valve seat to the closed position;
    the valve member having elongate valve shaft extending longitudinally of the axis providing a forward end presented beyond the forward end of the housing and the discharge mouth so that a mouth of the animal can engage the forward end of the valve shaft to tilt the valve member in the housing to move the valve member to the open position;

the water pressure of the supply and the valve being arranged such the water squirts though the valve seat when the valve member is moved to the open position;

and a resilient ring mounted on the valve shaft surrounding the valve shaft;

the resilient ring being located on the valve shaft between the valve seat and the forward end;

the resilient ring being axially spaced from the valve seat so as to define an annular chamber around the shaft behind the resilient ring;

the resilient ring being located wholly within the housing so that a forward end of the resilient ring is rearward of the discharge mouth at the forward end of the housing;

an outside edge of the resilient ring being located adjacent to and spaced from the inside surface of the housing so as to define an annular channel therebetween through which the water passes;

wherein the outside edge of the resilient ring intersects a straight line between the valve seat and the discharge mouth to impinge on water squirting through the valve seat so that the resilient ring restricts direct flow of water from the valve seat to the discharge mouth to prevent said squirting of the water exiting the discharge mouth.

2. The water supply nipple according to claim 1 wherein the shaft has an annular recess thereon locating an inner edge of the resilient ring.

3. The water supply nipple according to claim 1 wherein the resilient ring is annular and has circular outer edge so that the valve shaft can be deflected in any direction radial of the axis.

4. The water supply nipple according to claim 1 wherein the discharge mouth is circular and lies in a radial plane of the axis.

5. The water supply nipple according to claim 1 wherein the spring member comprises a resilient body mounted in the housing with an exterior surface of the resilient body in contact with the inside surface of the housing and there is provided a recess located on the outer surface of the resilient body which is in contact with the inside surface of the housing so that the recess and the inside surface form a convoluted channel through which the water passes from the supply to the discharge opening, wherein the resilient body applies a spring force to the valve component to move the component to the closed position so that operation of the component by the animal to the open position acts to compress the resilient body.

6. The water supply nipple according to claim 5 wherein the path is helical.

7. The water supply nipple according to claim 5 wherein the surface of the body is an exterior surface shaped to match the surface of the housing which is an interior surface.

8. The water supply nipple according to claim 5 wherein the path forms a helix around the body.

9. The water supply nipple according to claim 5 wherein the body is circular cylindrical.

10. The water supply nipple according to claim 5 wherein the body is resilient and is a loose within the housing when uncompressed and is forced into contact with a surface of the housing when compressed.

* * * * *